United States Patent [19]

Amos et al.

[11] E Re. 28,585

[45] Reissued Oct. 28, 1975

[54] APPARATUS FOR NUTATING AND STAINING A MICROSCOPE SLIDE

[75] Inventors: Lynn G. Amos, Raleigh; William R. Eppes, Cary, both of N.C.

[73] Assignee: Corning Glass Works, Corning, N.Y.

[22] Filed: Feb. 3, 1975

[21] Appl. No.: 546,350

Related U.S. Patent Documents

Reissue of:

[64] Patent No.: 3,853,092
Issued: Dec. 10, 1974
Appl. No.: 409,432
Filed: Oct. 25, 1973

[52] U.S. Cl. ..... 118/56; 74/640; 74/800; 134/160

[51] Int. Cl.[2] ..... B05C 13/00

[58] Field of Search ..... 118/52, 53, 56, 57, 500, 118/503, 501; 74/640, 800; 117/120; 134/160

[56] References Cited

UNITED STATES PATENTS

| | | | |
|---|---|---|---|
| 1,653,022 | 12/1927 | Schmidt | 118/48 X |
| 2,510,912 | 6/1950 | Schurenberg | 134/160 X |
| 3,031,339 | 4/1962 | Regan, Sr. et al. | 118/53 X |
| 3,534,707 | 10/1970 | Riddle | 118/503 X |
| 3,656,453 | 4/1972 | Tousimis | 118/53 X |

*Primary Examiner*—Morris Kaplan
*Attorney, Agent, or Firm*—Walter S. Zebrowski; Clarence R. Patty, Jr.

[57] ABSTRACT

An apparatus for staining a microscope slide is provided wherein the slide is supported by a member that is translated vertically simultaneously while it is being rotated so as to impart a nutating motion to the microscope slide. Staining reagents and rinses are dispensed to the top surface of the microscope slide whereby the nutating motion effects uniform wetting of the top microscope slide surface by each such reagent and rinse. Thereafter, the excess moisture on the microscope slide surfaces is drained prior to further processing.

25 Claims, 13 Drawing Figures

APPARATUS FOR NUTATING AND STAINING A MICROSCOPE SLIDE

Matter enclosed in heavy brackets [ ] appears in the original patent but forms no part of this reissue specification; matter printed in italics indicates the additions made by reissue.

BACKGROUND OF THE INVENTION

This invention relates to an apparatus for staining a microscope slide and more particularly to an apparatus which permits uniform wetting of the top microscope slide surface by the various staining reagents used as well as by a rinse fluid.

Heretofore, when a blood sample microscope slide was prepared, for example, it would be subjected to fix, stain, and buffer reagents for staining the film of blood cells and thereafter it would be rinsed and dried. Hand staining was one method by which a laboratory slide has heretofore been prepared. The reagents would be applied to the blood sample on the microscope slide and then caused to wet the entire sample surface. By such a method it was particularly difficult to obtain uniform staining since the stain would be affected by many variables such as the individual performing the staining, the amount of reagents applied, uniformity of reagent application, time that the sample was subjected to the reagents, and the like. In addition, hand staining was very time consuming.

Another method of staining blood sample microscope slides is the batch process. By this method, a number of microscope slides are disposed in a basket and successively dipped in vats of fix, stain, and buffer and thereafter they are rinsed and dried. This method is also time consuming and the resulting slides similarly lack uniform staining. The non-uniformity results for substantially the same reasons as set out above for hand staining. Furthermore, by successively dipping the microscope slides in the various reagents, the reagents become contaminated with the reagents in which the slides have been previously dipped.

One mechanized means for staining microscope slides is by means of the stainer described in U.S. Pat. No. 3,431,886 to J. B. McCormick et al. This stainer has the disadvantage that the apparatus needs cleaning often due to precipitates from staining which affect subsequent slides. In order to minimize such precipitates, this apparatus has the additional disadvantage of not being able to produce a deep or intense stain usually desired for blood samples.

SUMMARY OF THE INVENTION

It is the object of this invention to provide a simple, economical, and reliable apparatus for staining a microscope slide uniformly and efficiently, and one which overcomes the heretofore noted disadvantages.

Broadly, according to this invention, an apparatus for staining a microscope slide embodies a microscope slide support means on which a microscope slide is disposed in a plane slightly tilted from horizontal. The microscope slide support means is translated vertically simultaneously while it is rotated in an approximately horizontal plane so as to impart a nutating motion to the microscope slide. At least one staining reagent is dispensed to the top surface of the microscope slide whereby the nutating motion effects uniform wetting of the top microscope slide surface by each of said reagents and subsequent rinses. The excess rinse liquids may thereafter be drained and the microscope slide removed from the apparatus for subsequent utilization.

Additional objects, features, and advantages of the present invention will become apparent to those skilled in the art from the following detailed description and attached drawings on which, by way of example, only the preferred embodiments of the present invention are illustrated.

DETAILED DESCRIPTION OF THE INVENTION

It is to be noted that the figures of the drawings are illustrative and symbolic of the invention, and there is no intention to indicate scale or relative proportions of the elements shown therein. For purposes of simplicity, the present invention will be described in connection with an apparatus for forming blood slides for medical examination, however, the present invention is in no way limited to such an apparatus, rather is applicable to any apparatus by means of which one or more liquids are dispensed onto an article and thereafter caused to wet the surface of the article.

Figure 1:
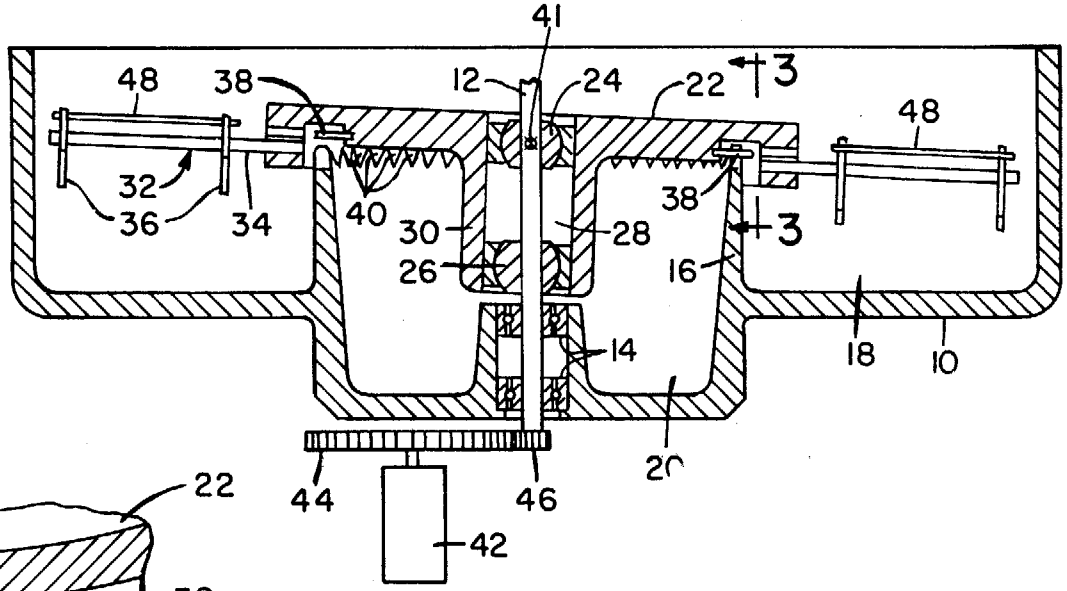
FIG. 1 is a cross-sectional elevation of one embodiment of the apparatus of the present invention.
Figure 2:
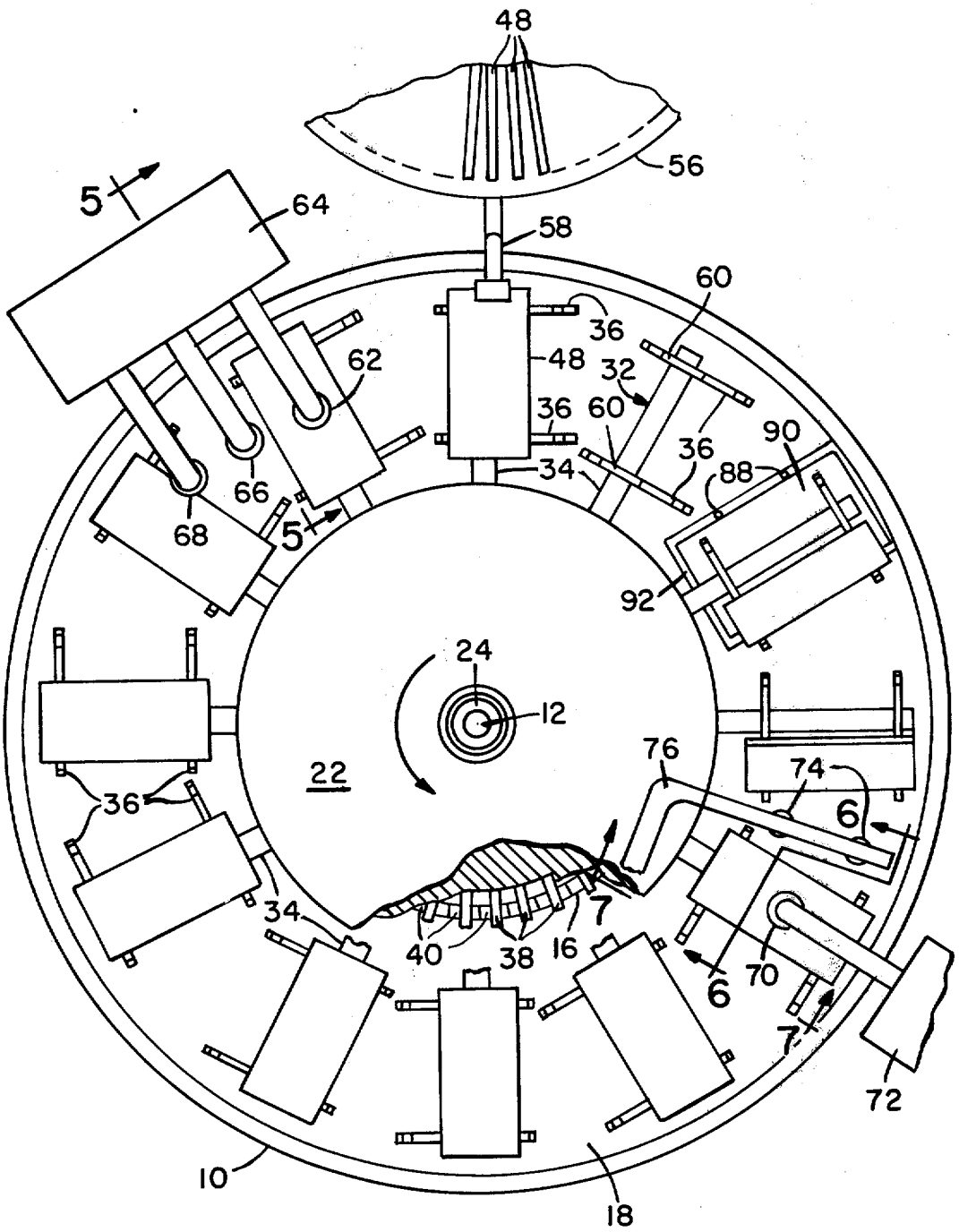
FIG. 2 is a plan view of the apparatus of FIG. 1.

Referring to FIGS. 1 and 2, there is shown housing 10 within which is mounted a main shaft 12 by means of bearings 14. A substantially cylindrical wall 16 is disposed within housing 10 substantially dividing housing 10 into peripheral compartment 18 within which blood slides are treated and central compartment 20 which houses at least a portion of the apparatus driving mechanism. Onto the upper portion of main shaft 12 is attached nutating ring 22 by means of spherical bearings 24 and 26. Spherical bearing 24 is concentrically fitted around shaft 12 within hole 28 in nutating ring 22. Hole 28 is concentrically formed within nutating ring 22 and bearing collar 30 thereof. Spherical bearing 26 is disposed within hole 28 in bearing collar 30 so that its central hole is eccentrically positioned within collar 30 as illustrated in FIG. 1. Such eccentricity of spherical bearing 26 may be accomplished by either eccentrically forming the central hole of bearing 26 or by fitting a sleeve within spherical bearing 26, which sleeve has an eccentrically formed hole therein for accepting shaft 12. If desired, hole 28 in nutating ring 22 could be formed in two portions, the portion within which spherical bearing 24 is to be fitted being concentrically formed while the portion within which spherical bearing 26 is to be fitted being eccentrically formed. In such latter embodiment, both spherical bearings could be normal spherical bearings wherein their central holes are concentrically formed.

As will be understood, the amount of eccentricity involved in disposing bearing 26 about shaft 12 and the distance between bearings 24 and 26 will determine the amount of tilt of nutating ring 22. The amount of tilt of nutating ring 22 being the angle that nutating ring 22 forms with respect to horizontal. As will hereinafter be explained in greater detail, other means for tilting nutating ring 22 are available.

As will also be hereinafter explained, the preferred angle of tilt of nutating ring 22 with horizontal may range between 1.5° to 4° for an apparatus for staining a microscope blood slide, however, tilt angles outside of this range may be useful in certain other applications.

To the outer peripheral edge of nutating ring 22 a plurality of flight assemblies 32 are attached. Each flight assembly comprises arm 34 and at least a pair of support members 36. Each arm 34 is fixedly attached to nutating ring 22 along a radial axis thereof while support members 36 are fixedly attached to each arm 34.

Figure 3:
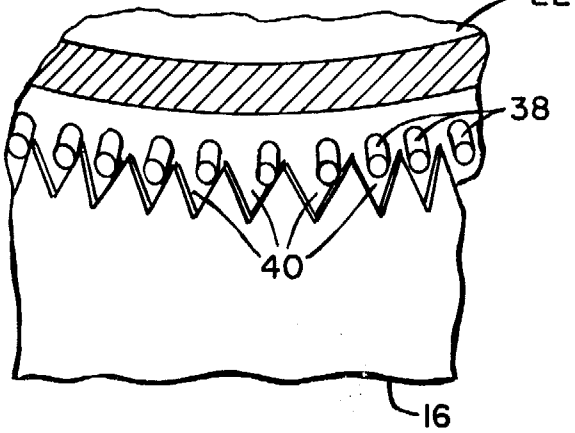
FIG. 3 is a fragmentary elevation, partly in section, of the apparatus of the present invention taken along lines 3—3 in FIG. 1.

Referring additionally to FIG. 3 which is section taken along 3—3 of FIG. 1, a plurality of drive pins 38 are affixed to nutating ring 22, each pin being disposed along a radial axis thereof. In the upper portion of cylindrical wall 16 a plurality of "V" shaped notches 40 are formed. Ordinarily, there is one more drive pin 38 affixed to nutating ring 22 than there are "V" shaped notches 40 for reasons hereinafter described in detail.

The operation of the apparatus shown in FIGS. 1 and 2 is as follows. A drive motor 42 causes shaft 12 to rotate by means of gear 44 attached to the drive motor shaft engaging gear 46 attached to main shaft 12. A typical motor speed may be 1 RPM and the gear ratio between gears 44 and 46 may be 6:1 whereby the rotation of main shaft 12 would be 6 RPM. As an example, 73 equally spaced radial drive pins may be affixed to nutating ring 22 and 72 "V" shaped grooves or notches 40 may be formed in the upper edge of cylindrical wall 16. As a result of the eccentricity of spherical bearing 26, nutating ring 22 may be tilted about nutation center 41 at an angle of 2½°, for example. Under such conditions, for each rotation of drive motor 42, main shaft 12 is caused to rotate 6 revolutions. Since nutating ring 22 is disposed on main shaft 12 such that drive pins 38 engage "V" shaped notches 40, nutating ring 22 is caused to rotate one seventy-second of a revolution for each rotation of main shaft 12. This comes about as a result of the number of drive pins 38 and "V" shaped notches 40 employed. Since there is one more drive pin than there are "V" shaped notches, nutating ring 22 will advance one notch for each rotation of main shaft 12, that is, one seventy-second of a revolution. Since main shaft 12 is rotated at 6 revolutions per minute in this example, nutating ring 22 will be caused to rotate at one-twelfth of a revolution per minute.

The location and height of the "V" shaped notches are controlled so that the drive pins will not bind within the notches when driven to the maximum downward translation due to the tilt of the nutating ring and that they will have adequate clearance between the bottom of the drive pins and the top of the teeth separating the "V" shaped notches when they are driven to the maximum upward translation. The angle of the "V" shaped notches is selected to be compatible with the drive pin diameter, pin translation, and desired rotational advance. A typical included angle of the "V" shaped notches may be 60°, for example.

Figure 4:
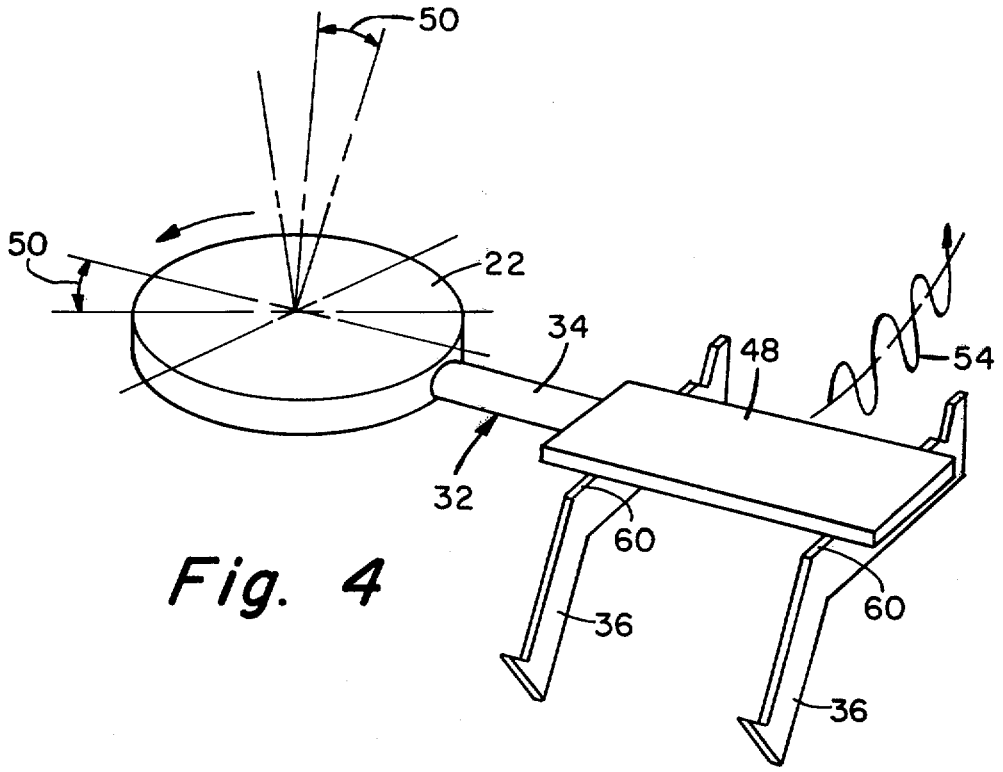
FIG. 4 is a diagrammatic illustration of the nutating motion of a blood slide in accordance with the present apparatus.

Referring additionally to FIG. 4 the motion of a typical microscope slide 48 caused by the apparatus of the present invention is illustrated. As nutating ring 22 is rotated by means of drive motor 42 causing drive pins 38 to engage "V" shaped notches 40, flight assemblies 32 are caused to be translated vertically as a result of the tilt angle of nutating ring 22. Accordingly, as nutating ring 22 is rotated substantially about a horizontal plane it is simultaneously being vertically translated up and down due to tilt angle 50. Microscope slide 48 being disposed upon support members 36 carried by arm 34, as diagrammatically illustrated in FIG. 4, is caused to follow a path substantially as illustrated by arrow 54. This motion of slide 48 is herein defined as the nutating motion of the present apparatus. This motion consists of translating the slide once up and down while it rotates 1/n revolutions per minute, n being the number of notches 40 in cylindrical wall 16. As is seen from arrow 54 in FIG. 4, this nutating motion resembles a sine wave.

Figure 5:
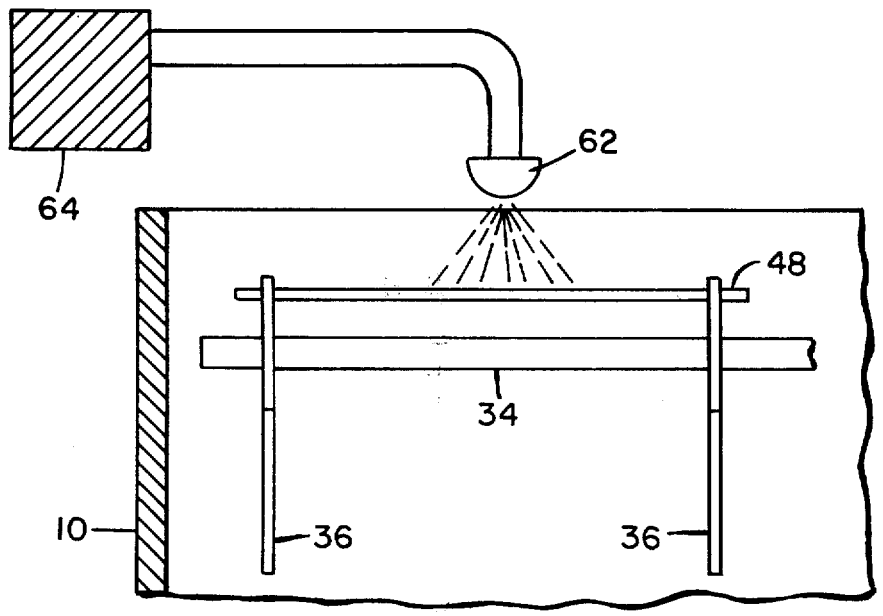
FIG. 5 is a fragmentary elevation, partly in section, of the apparatus of the present invention taken along lines 5—5 of FIG. 2.

The treatment of one typical microscope slide by the apparatus of the present invention is described as follows with reference to the embodiment illustrated in FIGS. 1 and 2. A microscope slide dispensing means 56 is disposed adjacent housing 10 so as to dispense a microscope slide at a predetermined desired time. Slide dispensing means 56 may be any suitable means such as a carrousel dispenser, chute, and the like. As a flight assembly 32 having support members 36 is rotated into position to accept a microscope slide, a signal to the slide dispensing means 56 may be triggered. Such a signal may be an electrical signal or a mechanical signal, such for example as a trigger mounted at the periphery of housing 10. Such signal means are not a critical element of the present invention since microscope slides may be placed upon the support members 36 manually, if desired. In FIG. 2 there is illustrated a carrousel means whereby carrousel arm 58 removes a slide from the carrousel and places it in a substantially horizontal position atop the upper surface 60 of one support member 36. Slide 48 is placed on support members 36 with the microscope sample on the upper surface thereof. As the nutating ring is caused to nutate as hereinabove described, slide 48 is caused to rotate and come under the first nozzle 62 of reagent or reactant dispenser 64. As is shown in FIG. 2, reactant dispenser 64 is illustrated as a three compartment dispenser with each compartment containing one of three reactants which are dispensed by means of the three nozzles 62, 66 and 68. For the treatment of a microscope blood slide, such reactants may be a fixative, dye, and buffer. Such blood reagents or reactants and their purposes are well known in the art. Referring also to FIG. 5, there is shown a cross-sectional view taken at section 5—5 of FIG. 2 showing one of the reactants being dispensed from nozzle 62 to the upper specimen containing surface of microscope slide 48.

After all of the desired reactants are dispensed to the top surface of microscope slide 48, these reactants are permitted to act upon the specimen on the microscope slide for a substantial portion of the rotation of the nutating ring as seen from FIG. 2. That is, these reactants act upon the slide specimen from the time they are dispensed to the surface of the microscope slide until the slide is rotated to the rinsing position. As is seen from FIG. 2, the reactants are rinsed from the microscope slide by means of rinse nozzle 70 which is connected to a suitable supply of rinsing solution, such for example as water, dispensed from rinsing solution dispenser 72.

As will be understood, nozzles 62, 66, 68 and 70 are illustrated in the drawings as general purpose nozzles, however, any nozzles suitable for this purpose may be used such, for example, as hypodermic-type needle dispensers.

Figure 6:
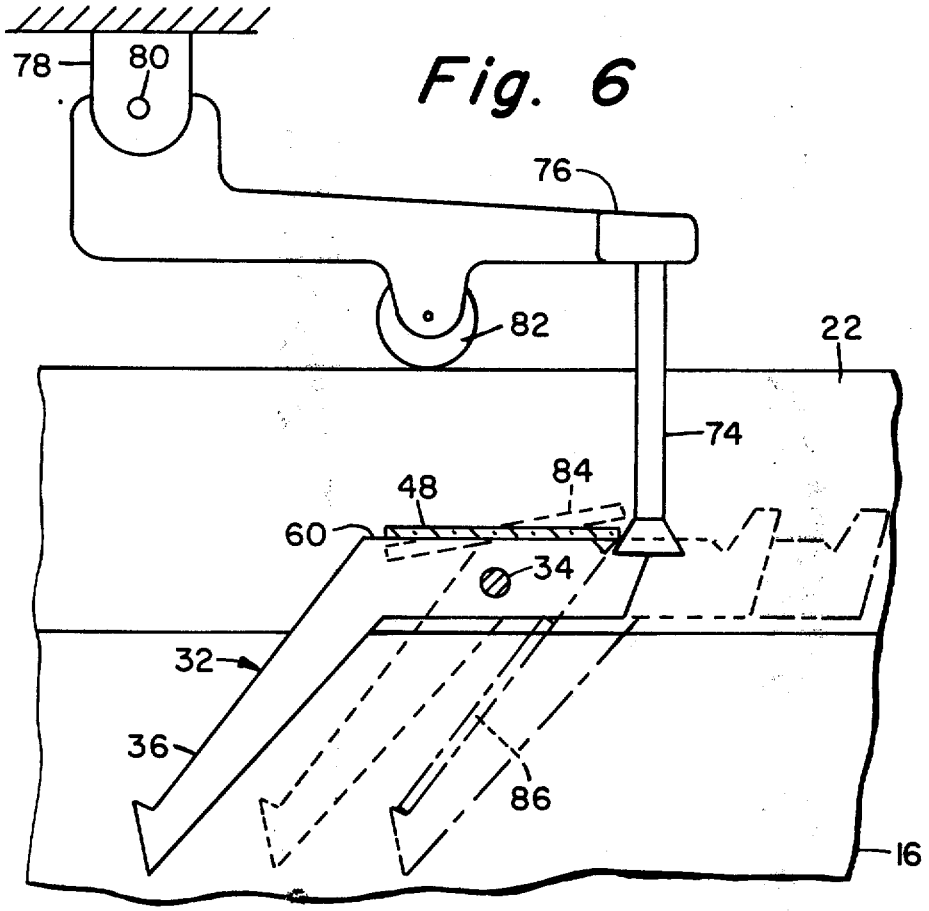
FIG. 6 is a fragmentary elevation, partly in section, of the apparatus of the present invention taken along lines 6—6 of FIG. 2.
Figure 7:
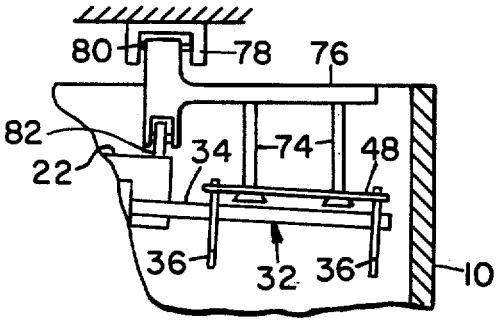
FIG. 7 is a fragmentary elevation, partly in section, of the apparatus of the present invention taken along lines 7—7 of FIG. 2.

Referring additionally to FIGS. 6 and 7, it is seen that after slide 48 is rinsed it is rotated further so as to come in contact with tipping arms 74. Tipping arms 74 are affixed to tipping arm holder 76 which in turn is pivotally mounted by means of bracket 78 and pin 80. Tipping arm holder 76 is caused to ride along the edge of nutating ring 22 by means of roller 82. Since flight assembly 32 together with microscope slide 48 are translated in a nutating motion as heretofore explained, it is necessary for tipping arms 74 to be vertically translated in an amount and direction corresponding to the vertical translation of flight assembly 32, microscope slide 48, and nutating ring 22. By pivotally mounting tipping arm holder 76 and letting it be responsive to the vertical motion of nutating ring 22 by means of roller 82, the ends of tipping arms 74 are always in position to engage each microscope slide 48 as it is rotated to the position of tipping arms 74. As flight assembly 32 and nutating ring 22 are rotated as heretofore described, microscope slide 48 is caused to slide along upper surface 60 of support member 36 until it reaches a position as illustrated by dotted lines 84. Dotted lines 84 illustrate microscope slide 48 as support member 36 has been rotated from under it to a position where the slide is being tipped over the edge of member 36. As will be understood, as flight assembly 32 and nutating ring 22 continue to be rotated slide 48 will be pushed over the edge of member 36 until it comes to rest as illustrated by the dot-dash lines 86. Once the microscope slide drops to this position, it passes under tipping arms 74 as flight assembly 32 and slide 48 continue to be rotated.

After slide 48 is tipped as described above, the rinsing solution and any remaining reactants are permitted to be drained off.

Figure 8:
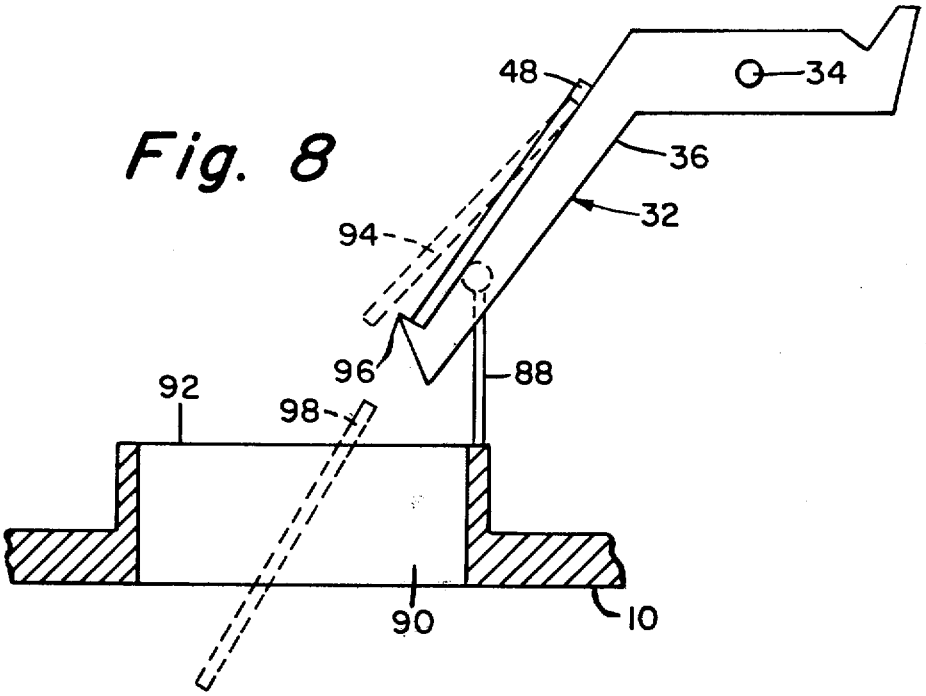
FIG. 8 is a fragmentary elevation, partly in section, of the means of removing a microscope slide from the apparatus of the present invention.
Figure 9:
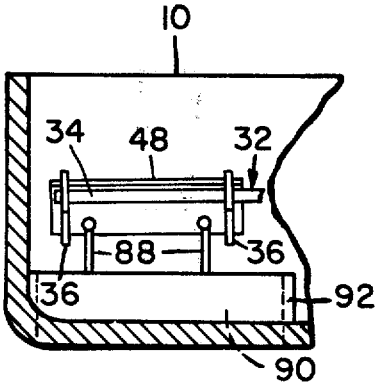
FIG. 9 is another fragmentary elevation, partly in section, of the means of removing a microscope slide from the apparatus of the present invention.

The microscope slide remains in such a tipped and draining position as it is rotated until it reaches the next station of the apparatus when it engages removal arms 88 as additionally shown in FIGS. 8 and 9. Removal arms 88 are mounted adjacent opening 90 in housing 10, which opening is defined by opening defining wall 92. As slide 48 in the draining position is rotated to contact removal arms 88, it is caused to be pushed off support member 36 as illustrated by dotted lines 94. Once the slide is pushed over protruding edge 96 of support arm 36 the microscope slide drops through opening 90 as illustrated by dotted lines 98 for further processing or utilization. For example, once slide 48 is removed from the present apparatus it may enter a drying apparatus wherein the slide is dried before examination of the specimen thereon.

Although the means for draining a microscope slide and removing it from the present apparatus have been hereinabove described in detail, such means are not limiting upon the present invention since any means for draining the slide and removing it from the apparatus may be suitable for the present purposes.

Figure 10:
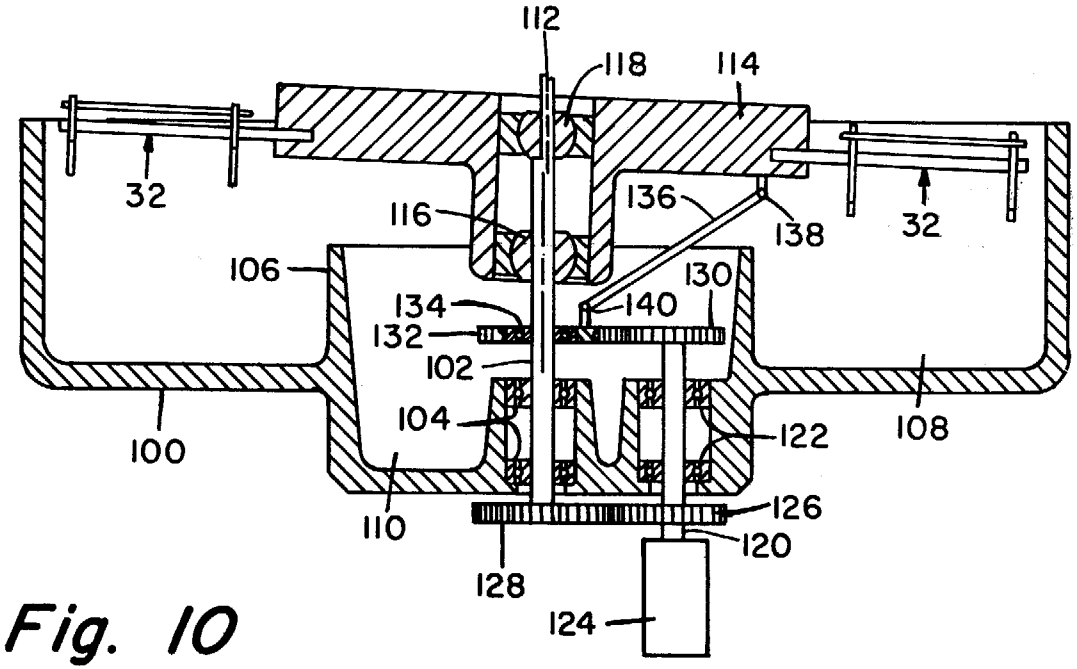
FIG. 10 is a cross-sectional view of another embodiment of the apparatus of the present invention.

Another embodiment for obtaining nutating motion for the apparatus of the present invention is illustrated in FIG. 10. In this embodiment housing 100 is provided within which main shaft 102 is mounted by means of bearings 104. A substantially cylindrical wall 106 is disposed within housing 100 substantially dividing housing 100 into peripheral compartment 108 within which blood slides are treated and central compartment 110 which houses at least a portion of the apparatus driving mechanism. Shaft 102 is formed in two sections, that is the upper portion thereof is machined so as to provide a stepped portion 112 having its longitudinal axis offset from the main longitudinal axis of shaft 102. Nutating ring 114 is mounted onto shaft 102 by means of spherical bearing 116 mounted about the main portion of shaft 102 and spherical bearing 118 mounted about the stepped portion 112 of shaft 102. Since spherical bearing 118 is eccentrically positioned from spherical bearing 116, nutating ring 114 is caused to be tilted with respect to the vertical axis of the apparatus. As heretofore described, flight assemblies 32 are mounted at the peripheral edge of nutating ring 114. A drive shaft 120 is also mounted within housing 100 by means of bearings 122. Drive motor 124 is connected to drive shaft 120 and provides the power for driving main shaft 102 as well as providing the power for the nutating motion of nutating ring 114.

Gear 126 is mounted on drive shaft 120 and engages gear 128 mounted on main shaft 102. Gear 130 is also mounted on drive shaft 120 and engages gear 132 mounted on main shaft 102 by means of bearing 134. Gear 132 is connected to nutating ring 114 by means of a connector arm 136 having a pair of universal joints 138 and 140 at each end thereof.

As will be understood, the amount of eccentricity between the main portion and step portion 112 of main shaft 102 and the distance between bearings 116 and 118 will determine the amount of tilt of nutating ring 114. As heretofore described, the amount of tilt of nutating ring 114 being the angle of nutating ring 114 with respect to horizontal. The degree of tilt of nutating ring 114 and the details with respect to treating a microscope slide will be the same in this embodiment as heretofore described. As is seen, in this embodiment there is no need for "V" shaped notches or drive pins.

The operation of the apparatus shown in FIG. 10 is as follows. Drive motor 124 causes drive shaft 120 to rotate. A typical motor speed may be 1 RPM and the gear ratio between gears 126 and 128 may be 6:1 whereby the rotation of main shaft 102 would be 6 RPM. The gear ratio between gears 130 and 132 may be 1:24 whereby the rotation of nutating ring 114 is 1/24 RPM while main shaft 102 rotates at 6 RPM. Acordingly, in this example nutating ring 114 will have 44 undulations or vertical translations for each rotaon thereof.

Figure 11:
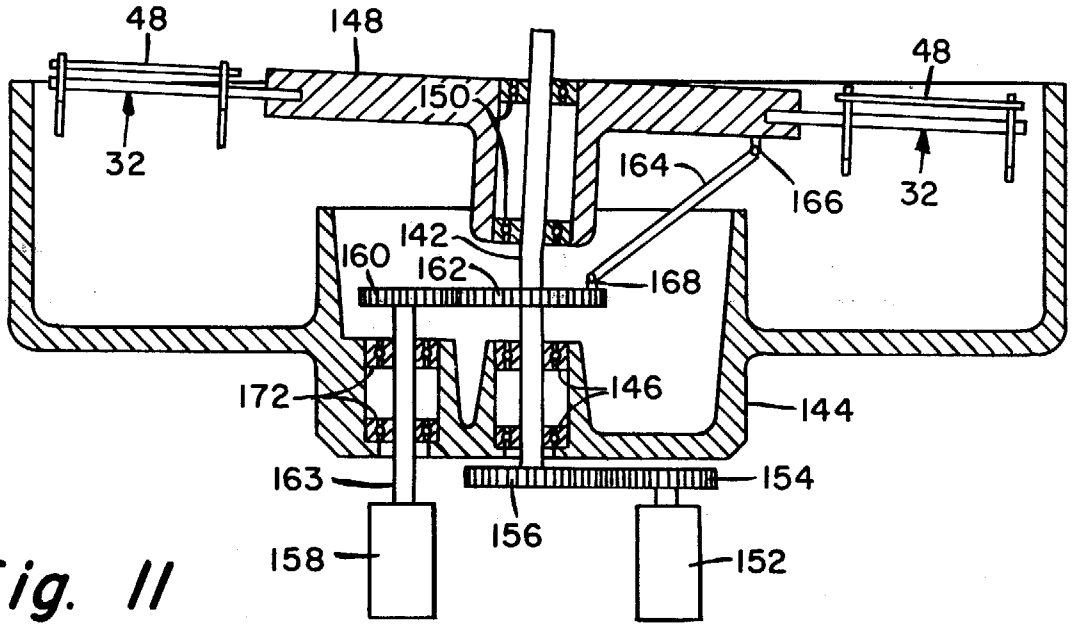
FIG. 11 is another cross-sectional (same as FIG. 10).

Another embodiment of the apparatus of the present ıvention is illustrated in FIG. 11. Main shaft 142 is ıounted within housing 144 by means of bearings 146. ıs is seen in this Figure, the tilt of nutating ring 148 is btained as a result of it being mounted on the upper ent portion of main shaft 142 by means of bearings 50. The amount of tilt of nutating ring 148 is the angle hich the upper bent portion of main shaft 142 forms ith longitudinal axis of the lower straight portion of ıain shaft 142. Main shaft 142 is rotated by motor 152 ırough gears 154 and 156. A second motor 158 drives ears 160 and 162 by means of shaft 163. Nutating ring 48 is connected to gear 162 by means of connector rm 164 and universal joints 166 and 168. Drive motor 58 drives gear 160 through shaft 170 which is ıounted within housing 144 by means of bearings 172.

As an example of the embodiment illustrated in FIG. 1, drive motor 152 may have a motor speed of 1 RPM ith gears 154 and 156 having a 1:6 ratio whereby ıain shaft 142 has a speed of 6 RPM. As will be undertood, drive motor 152 may have a speed of 6 RPM and e connected directly to main shaft 142 thereby obtainıg the same result. Motor 158 may typically have a peed of 1 RPM and gears 160 and 162 may have a atio of 1:12 whereby the rotation of gear 162 and conequently nutating ring 148 would be 1/12 RPM. The reatment of microscope slides 48 disposed on flight asemblies 32 would be as heretofore described.

Figure 12:
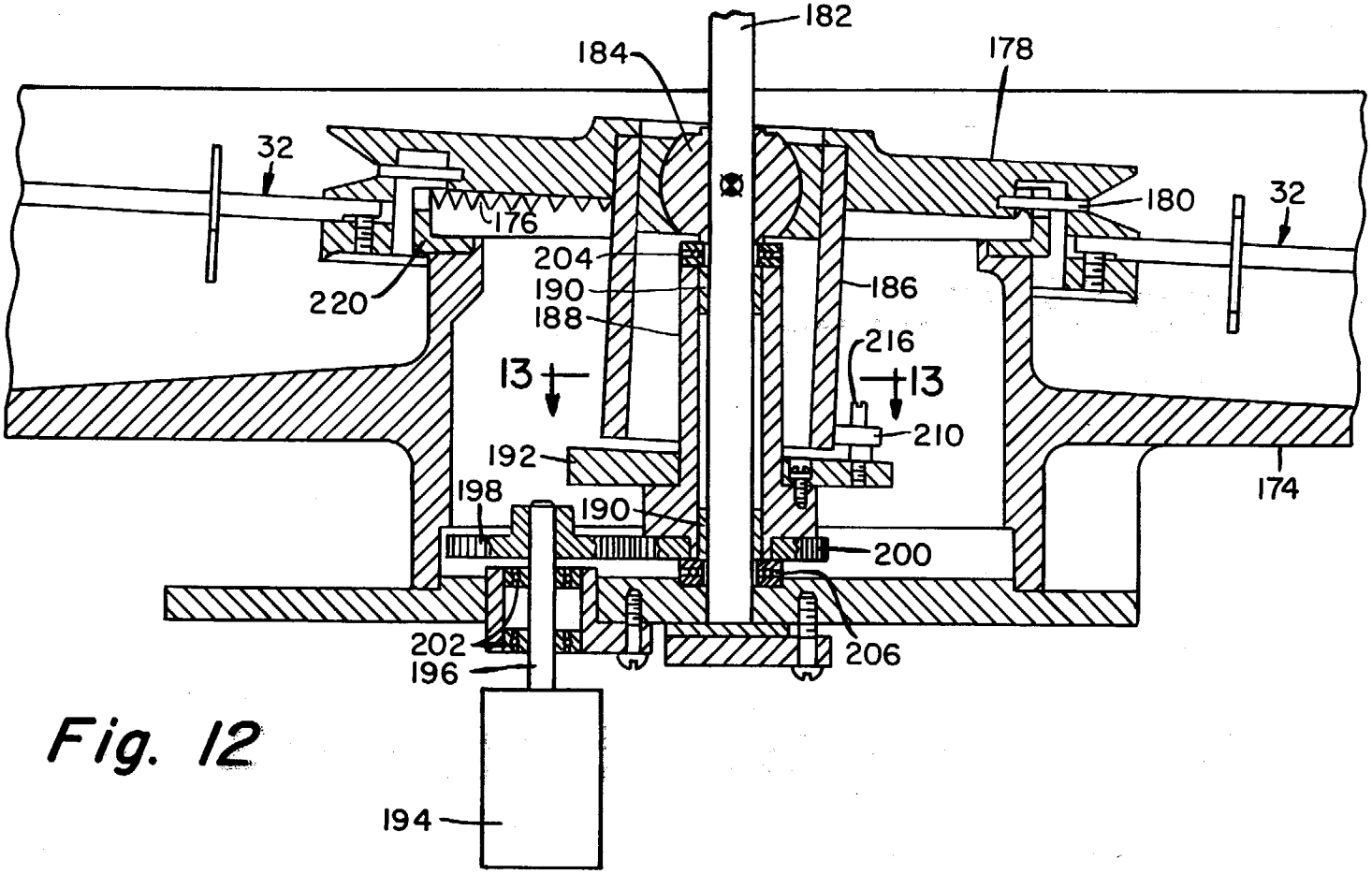
FIG. 12 is still another cross-sectional (same as FIG. 10).

A still further embodiment of the present invention ; illustrated in FIG. 12. In this embodiment housing 74 is provided with a plurality of "V" shaped notches 76 while nutating ring 178 is provided with a plurality f drive pins 180. Drive pins 180 engage "V" shaped otches 176 in the manner heretofore described in conection with the embodiment illustrated in FIGS. 1 and . Nutating ring 178 is attached to main shaft 182 by ıeans of spherical bearing 184 and nutating ring sleeve 86. Drive sleeve 188 is disposed around main shaft 82 by means of bearings 190. Attached to drive sleeve 82 by eccentric disc 192. Drive sleeve 188 and eccenric disc 192 is caused to rotate by means of drive ıotor 194 through drive shaft 196 and gears 198 and 00. Drive shaft 196 is positioned within housing 174 y means of bearings 202. Spherical bearing 184 and n turn nutating ring 178 is supported by thrust bearing 04 while gear 200 and in turn drive sleeve 188 is suported by means of thrust bearing 206.

Figure 13:
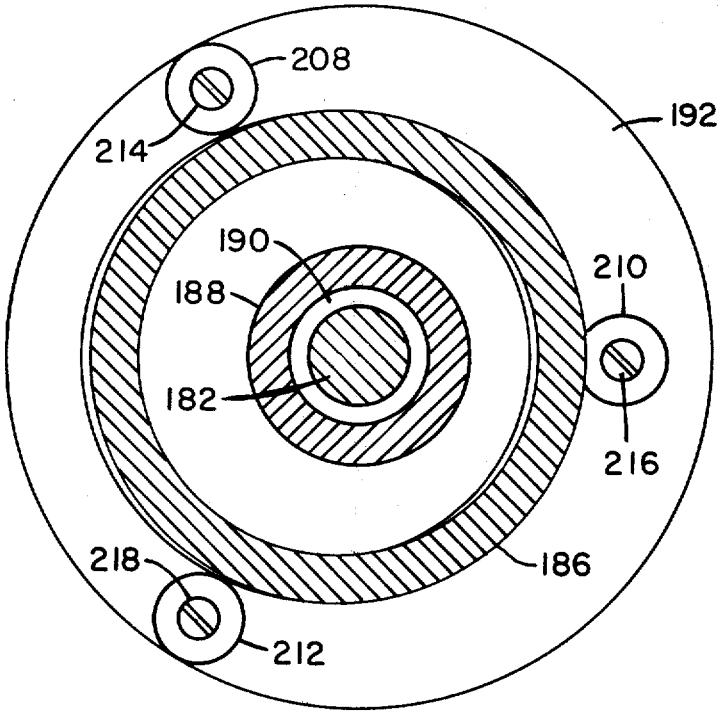
FIG. 13 is a fragmentary plan view, partly in section, of the apparatus of the present invention taken along lines 13—13 of FIG. 12.

Referring additionally to FIG. 13, there is seen that ıutating ring sleeve 186 is caused to be tilted about ıain shaft 182 by means of bearings 208, 210, and 212 ıounted on eccentric bearing shafts 214, 216, and 218 espectively. By properly positioning bearings 208, 10, and 212 on eccentric disc 192 and causing nutatıg ring sleeve 186 to be fitted inside of these bearings o that the bearings ride on the outside peripheral surace of nutating ring sleeve 186, nutating ring sleeve 86 and in turn nutating ring 178 is caused to be tilted o the desired angle. By providing bearings 208, 210, ınd 212 with eccentric bearing shafts 214, 216, and 18 the amount of tilt can be adjusted and the bearings an be adjusted to smoothly fit about the peripheral urface of nutating ring sleeve 186.

The operation of the apparatus shown in FIGS. 12 ınd 13 is as follows. Drive motor 194 causes drive sleeve 188 and in turn eccentric disc 192 to rotate through gears 198 and 200. A typical motor speed may be 1 RPM and the gear ratio between gears 198 and 200 may be 6:1 whereby the rotation of drive sleeve 188 and eccentric disc 192 would be 6 RPM. As an example, 73 equally spaced radial drive pins 180 may be affixed to nutating ring 178 and 72 "V" shaped grooves or notches 176 may be formed in the upper edge of wall 220 of housing 174. As a result of the eccentric spacing of bearings 208, 210, and 212, nutating ring 178 may be tilted at an angle of 2½°, for example. Under such conditions, for each rotation of drive motor 194, drive sleeve 188 and eccentric disc 192 are caused to rotate at 6 RPM. Since nutating ring 178 is disposed on main shaft 182 such that drive pins 180 engage "V" shaped notches 176, nutating ring 178 is caused to rotate one seventy-second of a revolution for each rotation of eccentric disc 192. This comes about as a result of the number of drive pins 180 and "V" shaped notches 176 employed. Since there is one more drive pin than there are "V" shaped notches, nutating ring 178 will advance one notch for each rotation of eccentric disc 192, that is, one seventy-second of a revolution. Since eccentric disc 192 is rotated at 6 RPM's in this example, nutating ring 178 will be caused to rotate at one-twelfth revolutions per minute.

The preceding examples illustrate various specific details as to gears, motors, bearings, speeds, and the like. Such details are not critical and may be adjusted as desired. Furthermore, the various arrangements of the components may be combined in various combinations as would be obvious to one skilled in the art from the preceding descriptions, wherefore, the specific arrangements are similarly not critical.

Although the present invention has been described with respect to specific details of certain embodiments thereof, it is not intended that such details be limitations upon the scope of the invention except insofar as set forth in the following claims.

We claim:

1. An apparatus for staining a microscope slide comprising microscope slide support means,

[means for disposing ] said microscope slide *being disposed* on said support means in a plane tilted from horizontal, means for rotating said support and microscope slide approximately horizontally, means for translating said support means vertically while it is being rotated so as to impart a nutating motion to said microscope slide, means for dispensing at least one staining reagent to the top surface of said microscope slide, said nutating motion effecting uniform wetting of said top surface of said microscope slide by each said reagent, and means for removing said microscope slide from said apparatus.

2. The apparatus of claim 1 further comprising means for dispensing said microscope slide to said support means.

3. The apparatus of claim 1 wherein said means for removing said microscope slide comprise a pair of arms for dislodging said microscope slide from said support means.

4. The apparatus of claim 1 further comprising means for rinsing said reagents.

5. The apparatus of claim 4 further comprising means for causing excessive amounts of rinsing solution to drain from said slide.

6. The apparatus of claim 1 wherein said means for rotating said support means comprises a substantially cylindrical member having a plurality of "V" shaped notches formed in one end thereof, and a plurality of drive pins engageably associated with said "V" shaped notches, the number of said drive pins being different than the number of said notches.

7. The apparatus of claim 6 wherein the number of drive pins is at least one more than the number of said "V" shaped notches.

8. The apparatus of claim 6 wherein the number of said drive pins is at least one less than the number of said "V" shaped notches.

9. The apparatus of claim 1 wherein said means for dispensing at least one staining reagent comprises a supply of each of three reagents and one spray nozzle connected to each such supply disposed above and along the rotational path of said microscope slide.

10. The apparatus of claim 1 further comprising means for tipping said microscope slide from said plane tilted from horizontal to a sloped drain position.

11. The apparatus of claim 10 wherein said means for tipping is responsive to said nutating motion of said microscope slide.

12. The apparatus of claim 10 wherein said means for removing said microscope slide comprises a pair of arms for dislodging said microscope slide from said support means.

13. The apparatus of claim 12 wherein said arms are disposed in the path of rotation of said microscope slide so as to contact said microscope slide in said sloped drain position.

14. The apparatus of claim 1 wherein said translating means comprise a drive shaft, a pair of spherical bearings mounted on said drive shaft, and a ring member mounted on said spherical bearings so as to permit rotation of said drive shaft therein, one of said spherical bearings having its shaft accepting aperture eccentrically positioned, said ring member being tilted with respect to the longitudinal axis of said drive shaft, said support means being affixed to said ring member.

15. The apparatus of claim 1 wherein said translating means comprises a drive shaft having a cylindrical offset portion at one end, the longitudinal axis of said offset portion being parallel to but displaced from the longitudinal axis of said drive shaft, a first spherical bearing disposed on said drive shaft, a second spherical bearing disposed on said cylindrical offset portion, and a ring member mounted on said spherical bearings so as to permit rotation of said drive shaft therein, said ring member being tilted with respect to said longitudinal axes, said support means being affixed to said ring member.

16. The apparatus of claim 1 wherein said translating means comprises a bent drive shaft, a pair of bearings mounted on the bent portion of said drive shaft, and a ring member mounted around said bearings on the bent portion of said drive shaft so as to permit rotation of said drive shaft therein, said ring member being tilted with respect to the longitudinal axis of said apparatus, said support means being affixed to said ring member.

17. The apparatus of claim 1 wherein said translating means comprises a drive shaft, a spherical bearing mounted on said drive shaft, a sleeve mounted on said spherical bearing so as to permit rotation of said shaft therein, a ring member concentrically and fixedly mounted to one end of said sleeve, a rotatable disc having one flat surface perpendicular to the longitudinal axis of said drive shaft and a second flat surface nonparallel to said first surface, three rollers mounted on said second flat surface of said rotatable disc positioned so as to contact the outside peripheral surface of said sleeve, the longitudinal axis of said sleeve being substantially perpendicular to said second flat surface, and means for rotating said disc whereby a nutating motion is imparted to said ring member.

18. The apparatus of claim 1 further comprising means for dispensing said microscope slide to said supporting means, means for rinsing said reagents, means for tipping said microscope slide from said plane tilted from horizontal to a sloped drain position, said means for tipping being responsive to said nutating motion of said microscope slide, and means for accommodating said microscope slide in said sloped drain position.

19. The apparatus of claim 18 wherein said rotational means comprise a plurality of "V" shaped notches, and a plurality of drive pins engageably associated with said "V" shaped notches, the number of said pins being different than the number of said "V" shaped notches.

20. The apparatus of claim 18 wherein the means for dispensing *at least one staining reagent* comprise a supply of each of three reagents and one spray nozzle connected to each such supply disposed above and along the rotational path of said microscope slide.

21. The apparatus of claim 20 wherein said means for removing said slide comprise a pair of arms for dislodging said microscope slide from said support means.

22. The apparatus of claim 18 wherein said translating means comprise a drive shaft, a pair of spherical bearings mounted on said drive shaft, and a ring member mounted on said spherical bearings so as to permit rotation of said drive shaft therein, one of said spherical bearings having its shaft accepting aperture eccentrically positioned, said ring member being tilted with respect to the longitudinal axis of said drive shaft, said support means being affixed to said ring member.

23. The apparatus of claim 18 wherein said translating means comprise a drive shaft having a cylindrical offset portion at one end, the longitudinal axis of said offset portion being parallel to but displaced from the longitudinal axis of said drive shaft, a first spherical bearing disposed on said drive shaft, a second spherical bearing disposed on said cylindrical offset portion, and a ring member mounted on said spherical bearing so as to permit rotation of said drive shaft therein, said ring member being tilted with respect to said longitudinal axes, said support means being affixed to said ring member.

24. The apparatus of claim 18 wherein said translating means comprise a bent drive shaft, a pair of bearings mounted on the bent portion of said drive shaft, and a ring member mounted on said bearings on the bent portion of said drive shaft so as to permit rotation of said drive shaft therein, said ring member being tilted with respect to the longitudinal axis of said apparatus, said support means being affixed to said ring member.

25. The apparatus of claim 18 wherein said translating means comprise a drive shaft, a spherical bearing mounted on said drive shaft, a sleeve mounted on said spherical bearing so as to permit rotation of said shaft therein, a ring member concentrically and fixedly mounted to one end of said sleeve, a rotatable disc having one flat surface perpendicular to the longitudinal axis of said drive shaft and a second flat surface nonparallel to said first surface, three rollers mounted on said second flat surface of said rotatable disc positioned so as to contact the outside peripheral surface of said sleeve, the longitudinal axis of said sleeve being substantially perpendicular to said second flat surface, and means for rotating said disc whereby a nutating motion is imparted to said ring member.

* * * * *